United States Patent
Goodman

(10) Patent No.: US 11,156,526 B1
(45) Date of Patent: Oct. 26, 2021

(54) TRIAXIAL LEAK CRITERION FOR OPTIMIZING THREADED CONNECTIONS IN WELL TUBULARS

(71) Applicant: Malcolm A. Goodman, Houston, TX (US)

(72) Inventor: Malcolm A. Goodman, Houston, TX (US)

(73) Assignee: eWellbore, LLC, Houston, TX (US)

( * ) Notice: Subject to any disclaimer, the term of this patent is extended or adjusted under 35 U.S.C. 154(b) by 317 days.

(21) Appl. No.: 16/413,331

(22) Filed: May 15, 2019

Related U.S. Application Data

(60) Provisional application No. 62/671,771, filed on May 15, 2018.

(51) Int. Cl.
*G01M 3/28* (2006.01)
*E21B 17/042* (2006.01)
*E21B 47/117* (2012.01)

(52) U.S. Cl.
CPC ......... *G01M 3/2853* (2013.01); *E21B 17/042* (2013.01); *E21B 47/117* (2020.05)

(58) Field of Classification Search
CPC ... G01M 3/2853; E21B 17/042; E21B 47/117
See application file for complete search history.

(56) References Cited

U.S. PATENT DOCUMENTS

| | | | |
|---|---|---|---|
| 5,788,401 A * | 8/1998 | Drenth | E21B 17/042 403/343 |
| 5,829,797 A * | 11/1998 | Yamamoto | F16L 15/001 285/333 |
| 6,045,481 A | 4/2000 | Kumagai | |
| 6,789,823 B2 | 9/2004 | Sches et al. | |
| 7,108,063 B2 | 9/2006 | Carstensen | |
| 7,172,037 B2 | 2/2007 | Dashevskiy et al. | |
| 7,878,268 B2 | 2/2011 | Chapman et al. | |
| 8,798,978 B2 | 8/2014 | Ertas et al. | |
| 8,914,213 B2 | 12/2014 | Chimner et al. | |

(Continued)

OTHER PUBLICATIONS

Drucker, D.C., et al., "Soil Mechanics and Plastic Analysis or Limit Design," Quarterly of Applied Mathematics, 1952, pp. 157-165, vol. 10, Nr. 2, American Mathematical Society, Brown University (Providence, Rhode Island, USA).

(Continued)

*Primary Examiner* — David Z Huang
(74) *Attorney, Agent, or Firm* — Culhane Meadows, PLLC

(57) ABSTRACT

A triaxial connection leak criterion for assessing and optimizing threaded connections in well tubulars, together with an associated leak safety factor for use in tubular design, is described. The triaxial leak criterion introduces the dependence of leak on hydrostatic pressure and on two constants associated with the connection: a Thread Modulus and a Makeup Leak Resistance. These two constants represent inherent properties of a particular threaded connection, independent of external conditions. Simple lab tests are described for determining the two connection constants, without expensive qualification testing or finite-element analysis. Graphical tools based on the triaxial leak criterion include a leak line and a leak circle for visually assessing the leak risk associated with any of a variety of load cases.

19 Claims, 3 Drawing Sheets

(56) References Cited

U.S. PATENT DOCUMENTS

| 8,925,975 | B2 | 1/2015 | Granger et al. |
| 9,057,245 | B2 | 6/2015 | Wassell |
| 9,429,008 | B2 | 8/2016 | Beylotte |
| 2007/0151360 | A1 | 7/2007 | Ring et al. |
| 2016/0186899 | A1* | 6/2016 | Besse .................... E21B 17/042 285/390 |

OTHER PUBLICATIONS

Lubinski, Arthur, et al., "Helical Buckling of Tubing Sealed in Packers," Journal of Petroleum Technology, Jun. 1962, pp. 655-670, vol. 14, Issue 6, SPE-178-PA, The Society of Petroleum Engineers (Richardson, Texas, USA).

Lubinski, A., "Influence of Neutral Axial Stress on Yield and Collapse of Pipe," Transactions of the ASME, Journal of Engineering for Industry, May 1975, pp. 400-407, The American Society of Mechanical Engineers (New York, New York, USA).

Mitchell, Robert F., "Tubing Buckling—The State of the Art," SPE Drilling & Completion, Dec. 2008, pp. 361-370, vol. 23, Issue 4, SPE-104267-PA, The Society of Petroleum Engineers (Richardson, Texas, USA).

Goodman, Malcolm A., et al., "New Tubular Design Ellipse with Backup Pressure," published in conjunction with the SPE Bergen One-Day Seminar in Bergen, Norway, Apr. 5, 2017, pp. 1-26, SPE-185941-MS, The Society of Petroleum Engineers (Richardson, Texas, USA).

Goodman, Malcolm A., "A Unified Approach to Yield, Buckling, and Leak in Well Tubulars," SPE Drilling & Completion, Mar. 2018, pp. 27-40, SPE 185855, The Society of Petroleum Engineers (Richardson, Texas, USA).

Goodman, Malcolm A., et al., "Dilatancy and Pressure Dependence of Threaded Connection Performance," published in conjunction with the IADC/SPE Drilling Conference and Exhibition in Fort Worth, Texas, Mar. 6-8, 2018, pp. 1-18, IADC/SPE-SPE-189712-MS; The Society of Petroleum Engineers (Richardson, Texas, USA).

* cited by examiner

TRIAXIAL LEAK CRITERION FOR OPTIMIZING THREADED CONNECTIONS IN WELL TUBULARS

CROSS REFERENCE TO RELATED APPLICATIONS

The present application claims the benefit of and priority to U.S. Provisional Application 62/671,771 filed May 15, 2018, and entitled, "Systems and Methods for Optimizing Well Tubulars and Threaded Connections," including appendices thereto, which is incorporated herein by reference in its entirety.

TECHNICAL FIELD

The disclosed subject matter relates to the design of well tubulars and, in particular, the optimization of threaded connections in well tubulars using a new triaxial leak criterion and leak safety factor.

BACKGROUND

During the drilling process, a well hole segment is typically supported by a tubular pipe called a casing. The next casing inside the previous casing supports the next hole segment, and so on, until the casing reaches the total depth of the well. The innermost pipe is the production string called tubing. The term 'tubular' will be used here for all wellbore pipes, including tubing, casing, liners, and tiebacks, as well as drill pipe, bottom hole assemblies, and work strings. In most strings, all the joints and connections are the same; namely, the same pipe diameters (inner and outer), the same connection type and size, and the same yield strength. Tapered strings have two or more sections; in each section, all the joints and connections are the same.

Most well tubulars are fabricated in cylindrical sections (typically, thirty to forty feet in length), oriented in a column, and joined together with threaded connections. The size, wall thickness, and yield strength of the tubular and its threaded connections are structurally designed to reduce the risk of failure, including pipe-body failure (burst, collapse, or axial parting) and threaded connection failure (leak, pull-out, or thread fracture).

For pipe body design, the yield strength (Y) of the pipe material (steel, typically) can be measured by placing a rod-shaped specimen of the material under axial tension until it yields. To evaluate pipe integrity, the yield point of the pipe body is typically compared to the von Mises stress ($\sigma_{VM}$), which is a scalar quantity determined from the stresses acting on the pipe body. In general, if the von Mises stress ($\sigma_{VM}$) is less than the yield strength (Y), the pipe body is safe.

For connection design, connection failure due to leak is an important part of current tubular design in the petroleum industry. The threaded connections currently available include standard connections (sometimes called API connections, referring to the standards of the American Petroleum Institute) and proprietary designs sometimes called premium connections. The mechanical behavior of a threaded connection can be estimated by using finite element analysis (FEA) or by conducting extensive testing. Current qualification testing procedures for leak assessment of a threaded connection involve numerous laboratory tests, conducted using specified axial forces (tension or compression) and specified internal and external pressures. The test procedure is repeated for a variety of different conditions, using multiple specimens of the connection. Each specimen is tested until it leaks. Internal leak tests are performed with no external backup pressure. External leak tests are performed with no internal backup pressure. The total cost of such testing can exceed one million dollars—and the results apply only to the specific threaded connection tested, and only to the precise size tested. Additional FEA or laboratory testing must be conducted for other sizes of the same connection design. The test results are typically plotted on a graph to display a connection leak envelope; analogous to the von Mises ellipse, with pressure on the ordinate (internal pressure positive) and axial force on the abscissa (tension positive). If the estimated loads on a threaded connection fall within the leak envelope, the connection is safe.

For tubular design, including the design for threaded connections, the currently used design criteria do not include a consideration of hydrostatic pressure. The current failure theories and equations for both the pipe body and for connections are based on shear and ignore hydrostatic pressure.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to-scale unless otherwise indicated. The dimensions of the various elements may be enlarged or reduced in the interest of clarity. The several figures depict one or more implementations and are presented by way of example only and should not be construed as limiting. Included in the drawings are the following figures.

DETAILED DESCRIPTION

Figure 1:
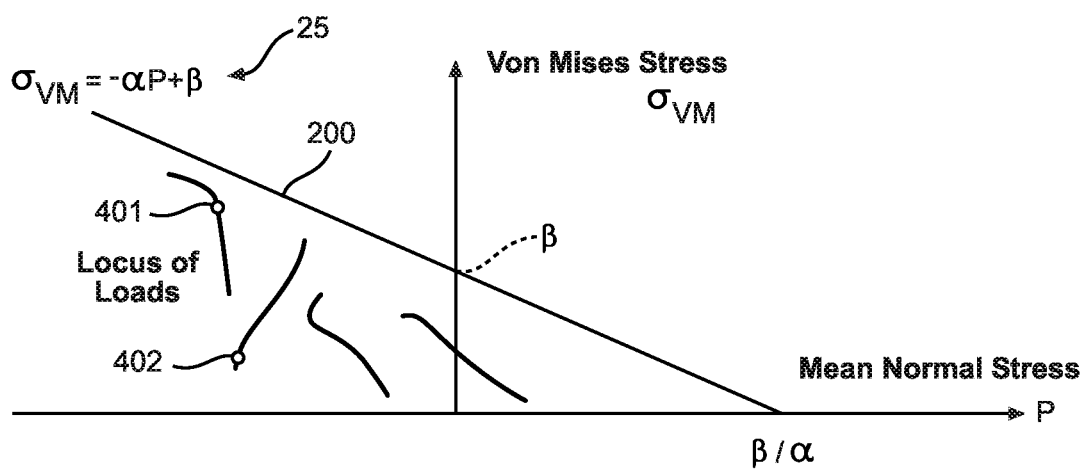
FIG. 1 is a graphical representation of a Triaxial Leak Criterion, including a leak line for a particular threaded connection.

The following detailed description includes numerous details and examples that are intended to provide a thorough understanding of the subject matter and its relevant teachings. Those skilled in the relevant art may understand how to apply the relevant teachings without such details. This disclosure is not limited to the specific devices, systems, and methods described because the relevant teachings can be applied or practiced in a variety of ways. The terminology and nomenclature used herein is for the purpose of describing particular aspects only and is not intended to be limiting.

Those skilled in the relevant art will recognize and appreciate that many changes can be made to the various aspects of the implementations described herein, while still obtaining the beneficial results. It will also be apparent that some of the desired benefits can be obtained by selecting some of the features, but not others. Accordingly, those who work in the art will recognize that many modifications and adaptations are possible and may even be desirable in certain applications, and that these are part of the disclosure.

The terms "comprising" and "including," and any forms thereof, are intended to indicate a non-exclusive inclusion; that is, to encompass a list that includes the items listed and may include others not expressly listed. As used herein, the singular forms "a," "an" and "the" include plural referents unless the context clearly dictates otherwise. Thus, for example, reference to a component can include two or more such components unless the context indicates otherwise. Relational terms such as "first" and "second" and the like may be used solely to distinguish one element or action from another, without implying any particular order between such elements or actions.

The terms "optional" or "optionally" mean that the subsequently described element or action may or may not occur. In other words, such a description includes instances where the element or action occurs and instances where it does not.

Then term "facilitate" means to aid, assist, enable, improve, or make easier. The term "inhibit" means to hinder, restrain, impede, restrain, thwart, oppose, or obstruct.

The words "proximal" and "distal" are used to describe items or portions of items that are situated closer to and away from, respectively, a user or a viewer. Thus, for example, the near end or other portion of an item may be referred to as the proximal end, whereas the generally opposing portion or far end may be referred to as the distal end.

As used herein, the term "constant" refers to a quantity or value that represents an inherent property of an object or thing. As opposed to a variable, a constant associated with an object does not change in response to extrinsic states or conditions. For example, the yield strength (Y) of a particular material is a constant.

Currently, the role of hydrostatic pressure in the design of well tubulars is not fully appreciated in the current failure theories for yield, buckling, connection leak, pull-out, or thread fracture. Hydrostatic pressure refers to the pressure exerted by a fluid or fluid-like substance on a body immersed in the substance. The currently used design criteria, failure theories, and equations for tubular design do not depend on hydrostatic pressure.

The total stress at each point in a tubular can be divided into a shear part and a hydrostatic part. The von Mises stress, defined as a scalar measure of the shear part, is used to assess the yield of the pipe material or, more specifically, to assess burst, collapse, tensile failure, and compressive failure of the pipe-body. The Lubinski fictitious force, often called the effective force, is used to evaluate buckling. Both yield and buckling are independent of the hydrostatic part of the stress; i.e., shear behavior alone governs these design criteria.

As part of tubular design, threaded connections, especially proprietary connections, are often evaluated and qualified for strength and sealing with design plots, called connection usage or service envelopes. These envelopes are used similarly to the von Mises ellipse and have the same axes, namely axial force and differential pressure. Laboratory tests and/or FEA (finite element analysis) are performed to develop the envelopes. The leak tests are typically performed with no backup pressure and with loads up to some percent of von Mises yield of the pipe body, so the effect of hydrostatic pressure is not even considered, implying that connection leak depends only on the shear part of the stress, like the pipe body.

The leak envelope for a threaded connection based on laboratory test results, if available, is used for tubular design by assuming that the internal or external pressure can be replaced with the differential pressure. This assumption is not supported by experimental evidence, creates inaccuracy, and eliminates the effect of hydrostatic pressure. Because the hydrostatic effect is disregarded, current connection design is biaxial (at best).

NEW APPROACH: Contrary to current practice, and as demonstrated herein, the leak resistance of a threaded connection is directly dependent on hydrostatic pressure. Hence, leak resistance is a function of the threaded connection's location (depth) in the well string. Tubular analysis using the von Mises equations alone (which assume shear only) does not adequately characterize the risk of leak at a threaded connection.

A new triaxial connection leak criterion is described herein, which includes the effect of hydrostatic pressure in a linear equation. Based on the new leak criterion, a new leak connection safety factor is described for evaluating connections and designing tubulars. A leak line and a leak circle are also described, which provide a graphical representation to quickly identify whether the expected loads are critical and will cause leak.

The tubular stresses can be calculated at every depth (z) based on the internal pressure (Pi), external pressure (Po), and axial force (Fz). (For clarity in small print, these and other denoted variables may appear herein without subscript letters.) This set of conditions—internal pressure (Pi), external pressure (Po), and axial force (Fz)—is known or can be measured or determined, in most cases, including any effect from temperature. As used herein, the depth (z) represents the axial or longitudinal direction along a tubular string, whether the well is solely vertical or not. For a vertical well, the measured depth equals the true vertical depth. For a non-vertical well, the measured depth is greater than the true vertical depth.

The complete description of the stress acting at a material point on a body is a nine-component tensor, which can be expressed as a three-by-three matrix (often depicted as a cube, with one normal stress and two shear stresses on each of the six faces; the stresses on opposing faces are equal). For a well tubular, in cylindrical coordinates, the normal stresses include the radial stress ($\sigma r$), the hoop stress ($\sigma\Theta$), and the axial stress ($\sigma z$). The radial stress and hoop stress depend only on the internal pressure (Pi), external pressure (Po), and the inner and outer diameter of the pipe, and can be calculated using the Lame equations. The axial stress can be calculated from the axial force (Fz), which includes pipe weight, and the cross-sectional area of the pipe. Most tubular design does not consider shear stresses, such as the stress generated by friction between the outer pipe surface and the borehole wall.

HYDROSTATIC PRESSURE: The leak resistance of a threaded connection is directly dependent on hydrostatic pressure. The mean normal stress, P, which is defined as the scalar measure of the hydrostatic part of the stress, is equal to the average of the three normal stresses, as follows, in cylindrical coordinates for a tubular:

$$P=(\sigma_r+\sigma_\Theta+\sigma_z)/3$$

In fact, by definition, the sum of the three normal stresses is simply the first stress invariant, which itself is a scalar and independent of the coordinate system. This coordinate independence (just as with the von Mises stress, which is the second invariant of the shear part of the stress) is an important feature of the new triaxial leak criterion. The term 'hydrostatic pressure' as used herein is equivalent to the mean normal stress, P, which reduces to the conventional meaning of hydrostatic pressure in certain circumstances; e.g., at the bottom of an open-end tubular in a drilled hole filled with static fluid, all three normal stresses in the tubular at its base are equal to the fluid pressure at that depth. In most cases, the three normal stresses at any point along the string and within the tubular wall are not equal. Hence, the mean normal stress, P, is triaxial and generalizes the hydrostatic concept to three dimensions.

A NEW TRIAXIAL CONNECTION LEAK CRITERION: The leak behavior of a threaded connection under triaxial stress is fully described by the new connection leak criterion:

$$\sigma_{VM} = -\alpha P + \beta$$

Triaxial Leak Criterion where P is the mean normal stress, and where alpha ($\alpha$) and beta ($\beta$) are new connection constants, as described and defined herein. The mean normal stress, P, in the Triaxial Leak Criterion introduces the dependence of leak on hydrostatic pressure—which is fundamental and different from all prior leak theories.

The new Triaxial Leak Criterion is also the basis for a new triaxial leak connection safety factor:

$$SF_{Leak} = \frac{-\alpha P + \beta}{\sigma_{VM}}$$

in which the numerator represents the working limit and the denominator represents the working stress. In practice, as described herein, a designer can approve a threaded connection if the leak safety factor is greater than a threshold value, which is typically a number equal to or greater than one. An additional 'design factor' may be selected by the designer (or imposed by an operator) as an additional margin of safety, in order to account for manufacturing tolerances and the like. For example, a designer or operator may specify 1.25 for the threshold value (which is the number typically used for the pipe body).

The connection constants, alpha ($\alpha$) and beta ($\beta$), represent inherent properties of a particular threaded connection, independent of extrinsic states or conditions. The connection constants for a particular connection are analogous to the material constant for a particular material; for example, the yield strength constant (Y) for a pipe-body material (steel, typically). In fact; if alpha ($\alpha$) equals zero, the hydrostatic dependence is eliminated and the Triaxial Leak Criterion reduces identically to the von Mises criterion (similar to that for the pipe body), and the constant beta ($\beta$) is analogous to the yield strength (Y).

Using the known equations (without bending) for von Mises stress ($\sigma_{VM}$) and for mean normal stress (P), the Triaxial Leak Criterion becomes:

$$\sigma_{VM} = \sqrt{\frac{1}{2}[(\sigma_r - \sigma_\theta)^2 + (\sigma_\theta - \sigma_z)^2 + (\sigma_z - \sigma_r)^2]} = -\alpha \frac{(\sigma_r + \sigma_\theta + \sigma_z)}{3} + \beta$$

Using the expressions for the axes of the von Mises circle and the Lubinski formula for neutral stress ($\sigma_n$), the Triaxial Leak Criterion becomes:

$$\sqrt{(\Delta P)^2 + (\Delta \sigma_z)^2} = -\alpha \frac{2\sigma_n + \sigma_z}{3} + \beta$$

where $\Delta P$ is the y-axis and $\Delta \sigma_z$ is the x-axis of the von Mises circle, and where the mean normal stress (P) is expressed as a function of the Lubinski neutral stress ($\sigma_n$) and the axial stress ($\sigma z$).

Adding and subtracting the Lubinski neutral stress ($\sigma_n$) in the first term on the right, defining $\Delta \sigma_z$ as Lubinski's "excess axial stress above its neutral value ($\sigma_n$)," and re-arranging terms, the Triaxial Leak Criterion becomes:

$$\sqrt{(\Delta P)^2 + (\Delta \sigma_z)^2} + \frac{\alpha}{3}(\Delta \sigma_z) = -\alpha \sigma_n + \beta$$

Using the equation for the Lubinski neutral stress ($\sigma_n$), which is a function of the internal radius (a), external radius (b), internal pressure (Pi) and external pressure (Po), the Triaxial Leak Criterion becomes:

$$\sqrt{(\Delta P)^2 + (\Delta \sigma_2)^2} + \frac{\alpha}{3}(\Delta \sigma_z) = \alpha \frac{b^2 p_o - a^2 p_i}{b^2 - a^2} + \beta$$

Leak Load Equation where the internal radius (a) and external radius (b) refer to the dimensions of the threaded connection, not the pipe body. For alpha equals zero, the Leak Load Equation reduces to the equation for the von Mises circle. If the internal pressure (Pi) is equal to the external pressure (Po) and is equal to the pressure exerted by the drilling mud at a depth (mud density ($\rho$) times depth (z)), then the right side of the equation above becomes $(\alpha)(\rho)(z)+\beta$. This demonstrates that leak resistance is dependent on depth (z). Finally, the Leak Load Equation also provides the basis for a graphical representation for leak assessment, as described herein.

Straight algebra can be applied here, as with other yield theories from the field of solid mechanics, to calculate the constants, alpha ($\alpha$) and beta ($\beta$), from simple laboratory tests. The new Triaxial Leak Criterion is similar to the Drucker-Prager yield criterion, which is a three-dimensional, hydrostatic-pressure-dependent model for analyzing stresses, deformation, and failure in materials such as soils, concrete, and polymers. The Coulomb theory is a two-dimensional subset of the Drucker-Prager criterion and has been applied to model the stresses in sand, soils, concrete and similar materials.

The Coulomb theory includes two material constants: angle of internal friction ($\phi$) and cohesion (c). When compared to the connection constants of a threaded connection, the angle of internal friction ($\phi$) is analogous to alpha ($\alpha$), which is associated with the geometry of the threads. The cohesion (c) is analogous to beta ($\beta$), which is associated with the components of the seal, including the effects of make-up interference and thread compound (for standard API connections) and metal-to-metal seals or elastomer rings with lubricants or other materials (for non-API proprietary connections). Applying the Coulomb failure criterion in the context of the Triaxial Leak Criterion provides a formula for the constants, alpha ($\alpha$) and beta ($\beta$), in terms of the Coulomb constants:

$$\alpha = \frac{2\sin\phi}{\sqrt{3}\,(3 - \sin\phi)}$$

$$\beta = \frac{6c\cos\phi}{\sqrt{3}\,(3 - \sin\phi)}$$

Alpha ($\alpha$) is a function of the angle ($\phi$) with no dependence on the cohesion (c). Beta ($\beta$) is a function of both the angle ($\phi$) and the cohesion (c).

The determination of the connection constants, alpha ($\alpha$) and beta ($\beta$), can be simplified by setting a number of boundary conditions which, in practice, are useful for designing experimental tests for measuring the values for alpha ($\alpha$) and beta ($\beta$) for a particular connection. As described herein, simple laboratory leak tests can be performed to determine the values for the connection constants.

A FIRST EXAMPLE EXPERIMENT involves placing a threaded connection in a uniaxial testing state, which is characterized by an axial load only—with no internal or external pressure. The axial load includes tension or compression. Thus, the experiment involves two tests. First, exerting an axial force in tension on the threaded connection and measuring the axial tension leak stress ($\sigma t$) at which leak occurs. Second, exerting an axial force in compression on said threaded connection and measuring the axial compression leak stress ($\sigma c$) at which leak occurs. In each test, a small but insignificant pressure may be used, to measure or otherwise sense when leak occurs.

The differences in the uniaxial leak stresses generate asymmetry, as predicted by the Drucker-Prager model. The uniaxial asymmetry ratio (m) can be expressed as:

$$m = \frac{\sigma_t}{\sigma_c}$$

In the context of leak testing, a leak will start when the uniaxial stress ($\sigma z$) reaches the axial tension leak stress ($\sigma t$) or the axial compression leak stress ($\sigma c$). Because the radial stress and hoop stress are zero (since the internal and external pressures are zero), and applying the Leak Load Equation, the formulas for the connection constants can be expressed as:

$$\sigma_t(1+\alpha/3)=\beta$$

$$\sigma_c(1+\alpha/3)=\beta$$

Solving for the connection constants:

$$\alpha = 3\frac{\sigma_c - \sigma_t}{\sigma_c + \sigma_t} = 3\frac{1-m}{1+m}$$

$$\beta = 2\frac{\sigma_c \sigma_t}{\sigma_c + \sigma_t} = 2\frac{\sigma_t}{1+m} = 2\frac{m\sigma_c}{1+m}$$

As shown, the constants, alpha ($\alpha$) and beta ($\beta$), can be calculated based on an experiment that measures the axial tension leak stress ($\sigma t$) and the axial compression leak stress ($\sigma c$). This is fully analogous to the simple uniaxial tension test for determining yield strength (Y) for the pipe body, except two tests are required for the threaded connection because there are two constants.

The uniaxial asymmetry ratio (m) can be expressed as:

$$m = \frac{1-\alpha/3}{1+\alpha/3}$$

Consideration of this formula for the uniaxial asymmetry ratio (m) demonstrates the role of alpha ($\alpha$) and beta ($\beta$). If alpha is zero, then the ratio (m) equals one and the uniaxial leak limits for tension and compression are equal. (When alpha equals zero in the Triaxial Leak Criterion, the effect of the mean normal stress (P) is zero, and the von Mises stress equals beta). As alpha increases for a given beta, the axial tension leak stress ($\sigma t$) decreases and the axial compression leak stress ($\sigma c$) increases. For a given alpha, the two uniaxial leak stresses can only increase if beta increases.

These relationships confirm that the constant alpha ($\alpha$) represents an internal property (namely, the geometry and behavior of the threads), and the constant beta ($\beta$) represents an external property (the seal elements, including makeup).

For a threaded connection, the constant alpha ($\alpha$) is a dimensionless stress ratio that characterizes the thread behavior, as well as the taper, to transfer the load and displacement across the threads. In this aspect, the constant alpha ($\alpha$) is a measure of the leak resistance ability of the threads and the taper. Accordingly, as used herein, the new connection constant alpha ($\alpha$) is referred to as the Thread Modulus.

The constant beta ($\beta$) is related to the ability of the seal to resist leak. According to the equations above: when beta equals zero, both the axial tension leak stress ($\sigma t$) and the axial compression leak stress ($\sigma c$) equal zero. In other words, when there is no beta (i.e., no seal to resist leak), then no axial load can be supported by the connection without resulting in leak. In this aspect, the constant beta ($\beta$) is a measure of the leak resistance ability of the seal. Accordingly, as used herein, the new connection constant beta ($\beta$) is referred to as the Makeup Leak Resistance.

A SECOND EXAMPLE EXPERIMENT for testing a threaded connection involves placing a threaded connection in a pressurized testing state, which is characterized by known internal and external pressures—with zero axial load. As with the uniaxial tests, this experiment involves two tests (to determine the two connection constants). First, exerting an external test pressure (Po) on the threaded connection is used to measure the external leak pressure (Pb) at which external leak occurs. Second, exerting an internal test pressure (Pi) is used to measure the internal leak pressure (Pa) at which internal leak occurs.

For the external leak test, the axial load is zero, the internal pressure (Pi) is zero, and the external pressure (Po) is equal to the external leak pressure (Pb) at the outer radius (b). With these conditions, the Leak Load Equation after re-arranging terms becomes:

$$p_b\left(1 - \frac{\alpha}{3}\right) = \beta\frac{b^2 - a^2}{2b^2}$$

where the internal radius (a) and external radius (b) refer to the dimensions of the threaded connection.

For the internal leak test, the axial load is zero, the external pressure (Po) is zero, and the internal pressure (Pi) is equal to the internal leak pressure (Pa) at the inner radius (a). With these conditions, the Leak Load Equation after re-arranging terms becomes:

$$p_a\left(K + \frac{\alpha}{3}\right) = \beta \frac{b^2 - a^2}{2a^2}$$

where K is a geometric quantity based on the inner radius (a) and the outer radius (b), according to the equation:

$$K = \frac{1}{2}\sqrt{1 + 3\frac{b^4}{a^4}}.$$

Defining a pressure asymmetry ratio (n) is useful in solving for alpha ($\alpha$) and beta ($\beta$) in the leak pressure relations above (for Pa and Pb). The pressure asymmetry ratio (n) is based on the internal leak pressure (Pa) at which leak occurs, and the external leak pressure (Pb) at which leak occurs, according to the equation:

$$n = K \frac{a^2}{b^2} \frac{p_a}{p_b}.$$

Using the pressure asymmetry ratio (n), alpha ($\alpha$) and beta ($\beta$) can be determined. The Thread Modulus ($\alpha$) is calculated according to the equation:

$$\alpha = 3K \frac{1-n}{K+n}$$

The Makeup Leak Resistance ($\beta$) is calculated according to the equation:

$$\beta = 2p_b \frac{n(K+1)}{K+n} \frac{b^2}{b^2 - a^2} = 2p_a \frac{K(K+1)}{K+n} \frac{a^2}{b^2 - a^2}$$

As described herein, the Thread Modulus ($\alpha$) and the Makeup Leak Resistance ($\beta$) can be measured objectively by experimentation—involving only two tests. The constants ($\alpha$, $\beta$) for a particular threaded connection do not change. Therefore, the constants ($\alpha$, $\beta$) measured using the pressurized testing state will be identical to the constants ($\alpha$, $\beta$) measured using the uniaxial testing state. Other test conditions may be applied to a threaded connection, resulting in the same measurements for the constants ($\alpha$, $\beta$).

A threaded connection can withstand differential pressures higher than current API ratings because of the effects of hydrostatic pressure. Internal and external pressures close the connection and "energize" (enhance) the seal; axial loads open or "dilate" the connection and reduce the seal. Formulated from the new Triaxial Leak Criterion, a leak line and a leak circle are also introduced for assistance in tubular design, to help designers easily and quickly identify critical loads for leak and, together with a leak safety factor plot versus depth (see FIG. 3) for one or more critical load cases, determines the location where leak is most likely to occur along the string.

The leak line and leak circle are more comprehensive and more accurate than existing leak envelopes because the new Triaxial Leak Criterion applies to all combinations of internal pressure, external pressure, and axial tension or compression—as opposed to the simple load combinations (without backup pressure) derived from the currently used lab tests or simulations using finite-element analysis. Additionally, the new leak line and leak circle plots can be easily developed for both API connections and non-API proprietary connections.

LEAK LINE: The Triaxial Leak Criterion is written in the classical form of a linear equation; namely, y=mx+b, where m is the slope of the line and b is the y-axis intercept. Accordingly, on a graph where the horizontal or x-axis represents values for mean normal stress (P) and the vertical or y-axis represents values for von Mises stress ($\sigma_{VM}$), the slope of the leak line 200 is alpha ($\alpha$, the Thread Modulus) and the y-intercept is beta ($\beta$, the Makeup Leak Resistance), as shown in FIG. 1.

FIG. 1 is a graphical representation of the Triaxial Leak Criterion 25 for a particular threaded connection. The leak line 200 is plotted according to the Triaxial Leak Criterion 25, which is displayed in FIG. 1 for reference.

The Thread Modulus ($\alpha$) and the Makeup Leak Resistance ($\beta$) can be determined through experimentation, as described herein. These constants ($\alpha$, $\beta$) do not change. The leak line 200 for a threaded connection will always have a slope equal to the Thread Modulus ($\alpha$) and a y-intercept equal to the Makeup Leak Resistance ($\beta$). In general, the leak risk is high for data points plotted on the graph that appear near or above the leak line 200; the leak risk is low for points significantly below the leak line 200.

In practice, the same threaded connection is used for all pipe joints in a well string. This minimizes the risk of error in the field during assembly. Accordingly, a tubular typically consists of the same OD, ID, grade (yield strength), and threaded connection along its entire length. Sometimes a tubular has two or more sections, wherein each section has the same parameters (OD, ID, grade (yield strength), and threaded connection) throughout the section.

The leak line 200 (and leak circle, described herein) apply to a section which has the same parameters. Accordingly, the Thread Modulus ($\alpha$) and the Makeup Leak Resistance ($\beta$) are the same at all points in the section. Therefore, along the length of a section of the string, the only variables are the set of conditions—internal pressure (Pi), external pressure (Po), and axial force (Fz)—for a given load case.

A load case, as used herein, refers to a set of conditions (pressures and forces) that are expected to occur or may occur in the field during the lifetime of the well. Different load cases are based on different load types, such as evacuation or gas kick. A load case includes a profile of conditions—internal pressure (Pi), external pressure (Po), and axial force (Fz)—at each point (depth, z) along the string (or section of a string). Those load values can be used to calculate the mean normal stress (P) and the von Mises stress ($\sigma_{VM}$) at each depth (z) along the string, for each load case.

For example, in FIG. 1, the locus of loads 401 on the graph is a plot of the pair of values (P, $\sigma_{VM}$) at every depth (z) along a string for a first load case. The locus of loads 402 shows the values for a second load case; and so on. A locus of loads may be plotted for several different load cases, as shown in FIG. 1, which provides the designer with a visual tool for assessing the relative leak risk among different load cases.

Each locus of loads is plotted as a continuous line because a connection can be situated anywhere along the tubular string. For analytical purposes, the fact that the threaded connections are spaced apart is not important. The precise location of each threaded connection is typically not part of the well planning process because the actual location, in the field, can and will vary.

Figure 3:
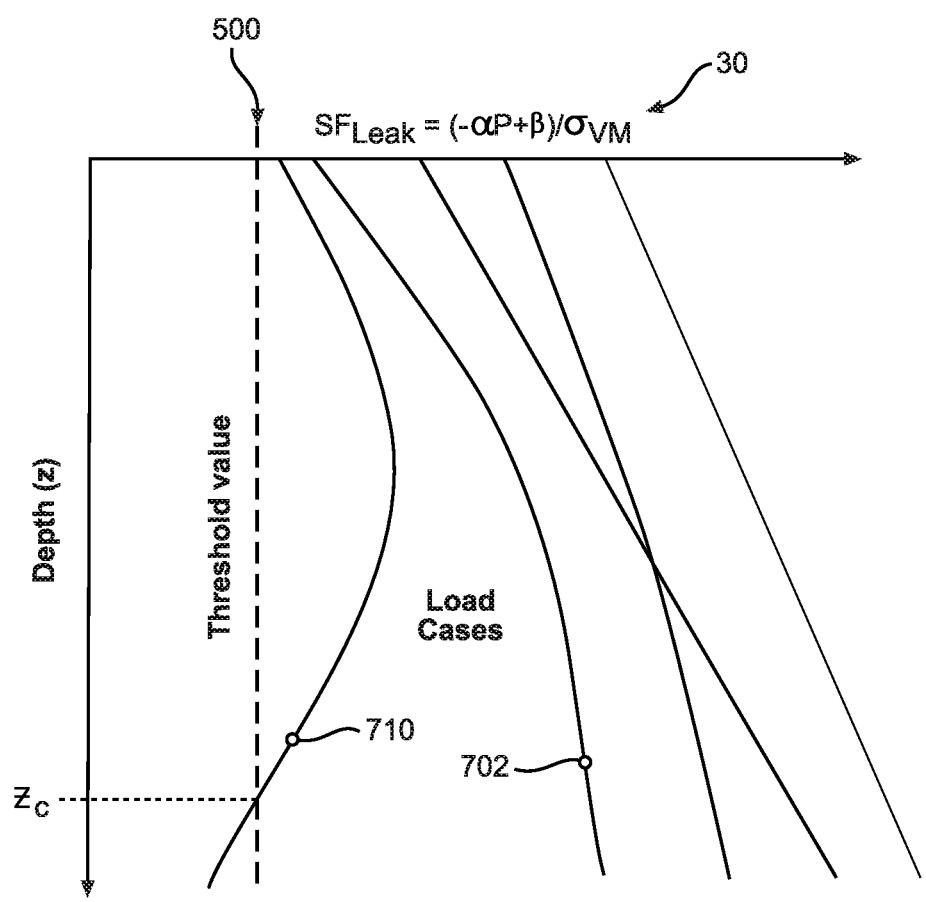
FIG. 3 is a graphical representation of a leak safety factor for a particular string, including a load case line for a number of load cases.

The curvilinear line for each locus of loads represents the relative leak risk of a particular threaded connection at each location along the string, relative to the leak line 200. If the locus of loads for any load case is near or above the leak line 200, then the leak risk for that load case is high for a string that uses that particular threaded connection. The designer may also refer to a plot of the leak safety factor versus depth, for one or more load cases, as shown in FIG. 3, to determine the location (or locations) along the string where the leak risk is high.

If the leak risk for any load case is higher than acceptable, the well designer may select a second threaded connection for use; and then repeat the steps of calculating and plotting the pairs of values (P, $\sigma_{VM}$) for various load cases. Note: the leak line will be different because the second threaded connection has its own unique Thread Modulus ($\alpha$) and Makeup Leak Resistance ($\beta$) (and the outer diameter of the second threaded connection may also be different). In this aspect, the leak line graph shown in FIG. 1 provides a tool for designers to evaluate different threaded connections with different load cases.

Figure 2:
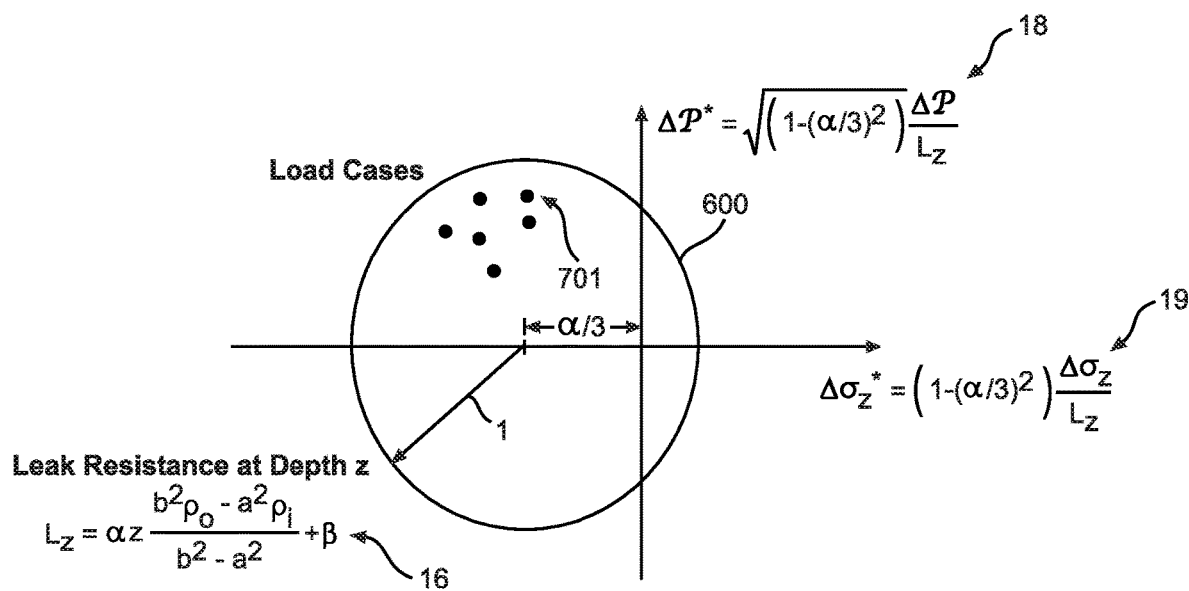
FIG. 2 is a graphical representation of a Triaxial Leak Criterion, including a leak circle for a particular string and a number of load cases.

LEAK CIRCLE. Like the leak line 200 shown in FIG. 1, the leak circle 600 shown in FIG. 2 applies to a string of pipe with the same threaded connection. The graph in FIG. 2 is similar to the von Mises circle, except the formulas for each axis have been adjusted in accordance with the new Triaxial Leak Criterion 25. If the von Mises circle axes were used without adjustment, then a different circle radius for each depth and each load case would be required.

The fluid pressures (Pi, Po) acting on a threaded connection vary with depth (z). The Leak Load Equation is an expression of the Triaxial Leak Criterion which includes internal and external pressures (Pi, Po). By assuming that the pressures (on the right side of the Leak Load Equation) at each depth (z) along the string can be approximated for all load cases by an equivalent fluid density at depth (z), and by using the internal and external densities ($\rho i$, $\rho o$), the Leak Load Equation becomes:

$$\sqrt{(\Delta\mathcal{P})^2 + (\Delta\sigma_z)^2} + \frac{\alpha}{3}(\Delta\sigma_z) = \alpha z \frac{b^2\rho_o - a^2\rho_i}{b^2 - a^2} + \beta$$

where $\Delta P$ is the differential pressure and $\Delta\sigma_z$ is the excess axial stress. The right side of the above equation defines the leak resistance at depth (z):

$$L_z = \alpha z \frac{b^2\rho_o - a^2\rho_i}{b^2 - a^2} + \beta$$

Leak Resistance at Depth z which is displayed (16) on FIG. 2 for reference. Dividing the preceding equation by ($L_z$) on both sides provides the dimensionless result:

$$\sqrt{(\Delta\mathcal{P}/L_z)^2 + (\Delta\sigma_z/L_z)^2} + \frac{\alpha}{3}(\Delta\sigma_z/L_z) = 1$$

Completing the square and re-arranging terms provides the formulas for the axes for the graph in FIG. 2; namely, $\Delta P^*$ for the y-axis and $\Delta\sigma_z^*$ for the x-axis:

$$\Delta\mathcal{P}^* = \sqrt{(1 - (\alpha/3)^2)} \frac{\Delta\mathcal{P}}{L_z}$$

$$\Delta\sigma_z^* = (1 - (\alpha/3)^2) \frac{\Delta\sigma_z}{L_z}$$

where $\Delta P^*$ is the normalized differential pressure and $\Delta\sigma_z^*$ is the normalized excess axial stress. These normalized values are dimensionless because of (Lz). These values are described as 'normalized' because, compared to $\Delta P$ and $\Delta\sigma_z$, the normalized values include the effect of the Thread Modulus ($\alpha$).

Values for normalized differential pressure ($\Delta P^*$) are displayed on the y-axis of the graph in FIG. 2. Values for normalized excess axial stress ($\Delta\sigma_z^*$) are displayed on the x-axis. The normalized differential pressure equation 18 is displayed in FIG. 2 for reference. The normalized excess axial stress equation 19 is also displayed in FIG. 2 for reference. Then, $$(\Delta P^*)^2 + (\Delta\sigma_z^* + \alpha/3)^2 = 1$$

is the formula for the leak circle 600, which is centered on the x-axis at $\Delta P^* = 0$ and $\Delta\sigma_z^* = -\alpha/3$, and has a radius equal to one, as shown in FIG. 2.

If alpha equals zero, the leak circle reduces to the von Mises circle, which has a radius of one and is centered at the origin of the axes, which are $\Delta P$ and $\Delta\sigma_z$. For the leak circle 600, the axes are $\Delta P^*$ and $\Delta\sigma_z^*$ as expressed above.

FIG. 2 is a graphical representation of the leak circle 600 at a particular depth (z) along the string. Each depth (z) along the string will have its own leak circle. Each load case involves the same threaded connection and has a pair of values ($\Delta P^*$, $\Delta\sigma_z^*$), calculated using the equations above. Plotting the pair of values on the graph will display a load case point 701, which represents the relative leak risk at depth (z) for a particular load case (and a string with a particular threaded connection) relative to the leak circle 600.

The other load case points represent the pair of values ($\Delta P^*$, $\Delta\sigma_z^*$) for other load cases. The plot in FIG. 2 shows six different load cases relative to the leak circle 600. This graph helps the designer select the best threaded connection to withstand all load cases without leaking.

The leak risk is low for load case points plotted significantly inside the leak circle 600; points near or outside the leak circle 600 have a high leak risk. The closer a point is to the leak circle 600, the higher the risk of leak (for that load case, and connection).

LEAK SAFETY PLOT: If one or more load case points are near the leak circle 600 in FIG. 2 (and/or if one or more locus of loads 401 is near the leak line 200 in FIG. 1), the designer may select one or more load cases for additional scrutiny. FIG. 3 is a plot of the leak safety factor ($SF_{Leak}$) on the x-axis versus depth (z) on the y-axis for a particular string. The leak safety equation 30 is displayed for reference.

FIG. 3 includes a line representing a threshold value 500. Typically, the threshold value 500 represents a leak safety factor that is equal to or greater than one. An additional 'design factor' may be selected by the designer, as an additional margin of safety. For example, a designer or operator may specify a threshold value 500 equal to 1.25 (which is the number typically used for the pipe body).

One or more load cases may be selected for display on the leak safety plot shown in FIG. 3. Each string will have its own leak safety plot. For each load case selected, the value of the leak safety factor ($SF_{Leak}$) can be calculated for each depth (z) along the string and plotted, as shown in FIG. 3. Five different load case lines are shown.

The closer the line is to the threshold value 500, the higher the leak risk. The load case lines provide a visual representation of the relative leak risk, which may include load cases that do not meet the threshold value 500 for leak safety. For example, the load case line 710 crosses the line representing the threshold value 500, indicating a high risk of leak. The leak safety plot also displays the depth at which leak is expected to occur for a load case. Load case line 710, for example, is expected to leak at or near a critical depth ($z_c$).

The load case lines also provide a visual representation of the leak risk relative to other load cases. For example, load case line 702 indicates a higher safety factor compared to load case line 710 at all depths. In this aspect, the graph may be used for a visual assessment of a plurality of load cases, beginning with a first load case and first load case line, and then subsequently evaluating and plotting other load case lines.

Just as one characteristic constant (yield strength, Y) has been used historically to evaluate the mechanical limits of the pipe-body material, the two characteristic connection constants described herein—the Thread Modulus ($\alpha$) and the Makeup Leak Resistance ($\beta$)—may be used to evaluate the mechanical limits for leak of threaded connections. Without the new Triaxial Leak Criterion described herein, well designers, operators, and connection suppliers will continue to use: (a) expensive testing methodology and FEA to qualify threaded connections, and (b) approximate safety factors, when selecting connections for specific applications. Neither (a) nor (b) currently consider hydrostatic dependence of connection performance. The new Triaxial Leak Criterion with two constants introduces the dependence on hydrostatic pressure, which is fundamental and different from all prior connector theories. The new Triaxial Leak Criterion has a key assertion—mechanical failure in all threaded connectors depends on hydrostatic pressure.

The technology disclosed herein may be used to reduce qualification testing and computer stress analysis (FEA) of threaded connections—with more efficient extrapolation across different connection types and sizes. The technology may also facilitate the optimized selection and placement of lower-cost threaded connections, resulting in structural efficiencies and cost savings. The technology may also facilitate the development and design of new types of threaded (and non-threaded) connections to optimize the connection constants, alpha ($\alpha$) and beta ($\beta$). Further, the technology may facilitate the development and use of new leak safety factors for connections, which will lead to more reliable and cost-efficient well designs. This technology is applicable to not only well designs, but also to any application in any industry that requires efficient performance of conduits with connections that have separable male-female parts (not welded) and that seal between internal and external environments. Even for non-sealing applications, such as solid (or non-solid) rods or columns with threaded connections, the new Triaxial Leak Criterion with dependence on the mean normal stress applies to structural failure of the threaded connections, such as from pullout or thread fracture.

Although the various embodiments are described with reference to petroleum engineering and down-the-hole drilling and production for oil and gas, the methods and systems described herein may be applied in a variety of contexts. For example, the technology and solutions described herein may be readily applied to any use or application that includes a column (vertical, horizontal, or otherwise) of elements having one or more threaded connections, especially when such a column is positioned within any substance that may be characterized as a fluid or causing fluid-like pressures on the column, such as from cement, soil, and rock or generally from any solid that squeezes or confines the column.

What is claimed is:

1. A method of evaluating the leak safety of threaded connections between joints of tubular pipe in a string, said method comprising:
   selecting a threaded connection for evaluation, said threaded connection having an inner radius (a) and an outer radius (b);
   calculating a mean normal stress (P) and a von Mises stress ($\sigma_{VM}$) at each depth (z) along a string, based on a set of conditions comprising an internal pressure ($P_i$), an external pressure ($P_o$), and an axial force ($F_z$);
   calculating a leak safety factor ($SF_{Leak}$) associated with said threaded connection according to the equation:

$$SF_{Leak} = \frac{-\alpha P + \beta}{\sigma_{VM}}$$

where alpha ($\alpha$) and beta ($\beta$) are connection constants comprising a Thread Modulus ($\alpha$) and a Makeup Leak Resistance ($\beta$), and wherein said connection constants represent inherent properties associated with said threaded connection, independent of said set of conditions; and
   approving said threaded connection if said leak safety factor ($SF_{Leak}$) is greater than a threshold value.

2. The method of claim 1, wherein said threshold value is a number equal to or greater than one.

3. The method of claim 1, wherein said step of approving said threaded connection further comprises:
   assessing a leak risk associated with said threaded connection according to a Triaxial Leak Criterion represented by the linear equation:

$$\sigma_{VM} = -\alpha P + \beta$$

wherein said leak risk is low if said von Mises stress ($\sigma_{VM}$) is less than the right side of said Triaxial Leak Criterion.

4. The method of claim 1, wherein said step of calculating a leak safety factor further comprises:
   calculating said Thread Modulus ($\alpha$) according to the equation:

$$\alpha = 3\frac{\sigma_c - \sigma_t}{\sigma_c + \sigma_t}$$

where ($\sigma_t$) is an axial tension leak stress at which leak occurs in said threaded connection under a uniaxial tension in a first axial test, and
   where ($\sigma_c$) is an axial compression leak stress at which leak occurs in said threaded connection under a uniaxial compression in a second axial test.

5. The method of claim 4, wherein said step of calculating a leak safety factor further comprises:
   calculating said Makeup Leak Resistance ($\beta$) according to the equation:

$$\beta = 2\frac{\sigma_c \sigma_t}{\sigma_c + \sigma_t}.$$

6. The method of claim 1, wherein said step of calculating a leak safety factor further comprises:
calculating said Thread Modulus ($\alpha$) according to the equation:

$$\alpha = 3K\frac{1-n}{K+n}$$

where (K) is a geometric quantity based on said inner radius (a) and said outer radius (b), according to the equation:

$$K = \frac{1}{2}\sqrt{1+3\frac{b^4}{a^4}}$$

and where (n) is a pressure asymmetry ratio based on (1) an external leak pressure ($P_b$) at which external leak occurs in said threaded connection in a first pressure test, and (2) an internal leak pressure ($P_a$) at which internal leak occurs in said threaded connection in a second pressure test, according to the equation:

$$n = K\frac{a^2}{b^2}\frac{p_a}{p_b}.$$

7. The method of claim 6, wherein said step of calculating a leak safety factor further comprises:
calculating said Makeup Leak Resistance ($\beta$) according to the equation:

$$\beta = 2p_b\frac{n(K+1)}{K+n}\frac{b^2}{b^2-a^2} = 2p_a\frac{K(K+1)}{K+n}\frac{a^2}{b^2-a^2}.$$

8. The method of claim 1, further comprising:
displaying a graph having an x-axis representing values for mean normal stress (P) and a y-axis representing values for von Mises stress ($\sigma_{VM}$);
for said threaded connection, plotting a leak line on said graph according to said Triaxial Leak Criterion:

$$\sigma_{VM} = -\alpha P + \beta$$

selecting a load case for leak assessment, said load case characterized by a set of load conditions comprising internal load pressure ($P_i$), external load pressure ($P_o$), and axial load force ($F_z$) at each depth (z) along said string;
based on said set of load conditions for said load case, calculating a set of load value pairs comprising a load von Mises stress ($\sigma_{VM}$) and a load mean normal stress (P) at each depth (z) along said string;
plotting said set of load value pairs on said graph, thereby displaying a locus of loads associated with said load case at all depths (z) along said string; and
visually assessing a leak risk associated with said load case based on said locus of loads relative to said leak line.

9. The method of claim 8, further comprising:
determining that said leak risk is high if a portion of said locus of loads appears near or above said leak line.

10. The method of claim 8, further comprising:
determining that said leak risk is low if a portion of said locus of loads appears below said leak line.

11. The method of claim 1, further comprising:
selecting a load case for leak assessment, said load case characterized by a subset of load conditions comprising internal load pressure ($P_i$), external load pressure ($P_o$), an internal fluid density ($\rho_i$), and an external fluid density ($\rho_o$);
calculating a Leak Resistance ($L_z$) according to the equation:

$$L_z = \alpha z\frac{b^2\rho_o - a^2\rho_i}{b^2-a^2} + \beta$$

displaying a graph having an x-axis representing values for normalized differential pressure ($\Delta P^*$) and a y-axis representing values for normalized excess axial stress ($\Delta\sigma_z^*$) according to the equations:

$$\Delta P^* = \sqrt{(1-(\alpha/3)^2)}\frac{\Delta P}{L_z}$$

$$\Delta\sigma_Z^* = (1-(\alpha/3)^2)\frac{\Delta\sigma_Z}{L_Z}$$

where ($\Delta P$) is a differential pressure and ($\Delta\sigma_z$) is an excess axial stress at said depth (z);
for said load case, plotting a leak circle on said graph according to the center-radius equation:

$$(\Delta P^*)^2 + (\Delta\sigma_z^* + \alpha/3)^2 = 1$$

calculating a pair of values based on said subset of load conditions, said pair of values comprising a normalized differential pressure for said load case ($\Delta P^*$) and a normalized excess axial stress for said load case ($\Delta\sigma_z^*$);
plotting a load case point on said graph using said pair of values; and
visually assessing a leak risk associated with said load case based on said load case point relative to said leak circle.

12. The method of claim 11, further comprising:
determining that said leak risk is high if said load case point appears near or outside said leak circle.

13. The method of claim 11, further comprising:
determining that said leak risk is low if said load case point appears within said leak circle.

14. The method of claim 1, further comprising:
selecting a first load case associated with a first string for leak safety assessment, said first string characterized by a first threshold value for safety, said first load case characterized by a first set of points comprising a case safety value and a depth;
displaying a graph having an x-axis representing values for leak safety factor ($SF_{Leak}$) and a y-axis representing values for depth (z);
plotting a first threshold line on said graph based on said first threshold value;
plotting said first set of points on said graph, thereby displaying a first load case line associated with said first load case; and
visually assessing a first leak risk associated with said first load case based on said first load case line relative to said threshold line, wherein said first leak risk is high if said first load case line crosses said first threshold line.

15. The method of claim 14, further comprising:
when said graph indicates said first leak risk is high, determining a first critical depth at which said first load case line crosses said first threshold line.

16. A method of testing a threaded connection, said method comprising:
placing a threaded connection in a uniaxial testing state characterized by an axial force, no internal pressure, and no external pressure, wherein said axial force comprises an axial tension or an axial compression;
in a first axial test, exerting said axial tension on said threaded connection and measuring an axial tension leak stress ($\sigma_t$) at which leak occurs;
in a second axial test, exerting said axial compression on said threaded connection and measuring an axial compression leak stress ($\sigma_c$) at which leak occurs;
calculating a Thread Modulus ($\alpha$) according to the equation:

$$\alpha = 3\frac{\sigma_c - \sigma_t}{\sigma_c + \sigma_t}$$

and calculating a Makeup Leak Resistance ($\beta$) according to the equation:

$$\beta = 2\frac{\sigma_c \sigma_t}{\sigma_c + \sigma_t}.$$

17. The method of claim 16, further comprising:
calculating a mean normal stress (P) and a von Mises stress ($\sigma_{VM}$) at each depth (z) along a string, based on a set of conditions comprising an internal pressure ($P_i$), an external pressure ($P_o$), and an axial force ($F_z$);
assessing a leak risk associated with said threaded connection according to a Triaxial Leak Criterion represented by the linear equation:

$$\sigma_{VM} = -\alpha P + \beta$$

wherein said leak risk is low if said von Mises stress ($\sigma_{VM}$) is less than the right side of said Triaxial Leak Criterion.

18. A method of testing a threaded connection, said method comprising:
placing a threaded connection in a pressurized testing state characterized by no axial force and a test pressure, wherein said test pressure comprises an internal test pressure ($P_i$) or an external test pressure ($P_o$);
in a first pressure test, exerting said external test pressure ($P_o$) and no internal test pressure ($P_i$) on said threaded connection and measuring an external leak pressure ($P_b$) at which external leak occurs;
in a second pressure test, exerting said internal test pressure ($P_i$) and no external test pressure ($P_o$) on said threaded connection and measuring an internal leak pressure ($P_a$) at which internal leak occurs;
calculating a Thread Modulus ($\alpha$) according to the equation:

$$\alpha = 3K\frac{1-n}{K+n};$$

and calculating a Makeup Leak Resistance ($\beta$) according to the equation:

$$\beta = 2p_b \frac{n(K+1)}{K+n}\frac{b^2}{b^2-a^2} = 2p_b\frac{K(K+1)}{K+n}\frac{a^2}{b^2-a^2}$$

where (K) is a geometric quantity based on said inner radius (a) and said outer radius (b), according to the equation:

$$K = \frac{1}{2}\sqrt{1+3\frac{b^4}{a^4}}$$

and where (n) is a pressure asymmetry ratio based on an internal leak pressure ($P_a$) and an external leak pressure ($P_b$), according to the equation:

$$n = K\frac{a^2}{b^2}\frac{p_a}{p_b}.$$

19. The method of claim 18, further comprising:
calculating a mean normal stress (P) and a von Mises stress ($\sigma_{VM}$) at each depth (z) along a string, based on a set of conditions comprising an internal pressure ($P_i$), an external pressure ($P_o$), and an axial force ($F_z$);
assessing a leak risk associated with said threaded connection according to a Triaxial Leak Criterion represented by the linear equation:

$$\sigma_{VM} = -\alpha P + \beta$$

wherein said leak risk is low if said von Mises stress ($\sigma_{VM}$) is less than the right side of said Triaxial Leak Criterion.

* * * * *